(12) United States Patent
Hastie et al.

(10) Patent No.: US 10,513,302 B2
(45) Date of Patent: Dec. 24, 2019

(54) COMPOSITE BICYCLE FRAME AND METHOD OF MANUFACTURING SAME

(71) Applicant: INDUSTRIES RAD INC., Saint-Georges, Beauce (CA)

(72) Inventors: Joanne Hastie, North Vancouver (CA); Paolo Feraboli, Seattle, WA (US)

(73) Assignee: INDUSTRIES RAD INC., Saint-Georges (CA)

( * ) Notice: Subject to any disclaimer, the term of this patent is extended or adjusted under 35 U.S.C. 154(b) by 221 days.

(21) Appl. No.: 15/107,314

(22) PCT Filed: Dec. 23, 2014

(86) PCT No.: PCT/CA2014/051256
§ 371 (c)(1),
(2) Date: Jun. 22, 2016

(87) PCT Pub. No.: WO2015/095966
PCT Pub. Date: Jul. 2, 2015

(65) Prior Publication Data
US 2017/0021888 A1    Jan. 26, 2017

Related U.S. Application Data

(60) Provisional application No. 61/920,142, filed on Dec. 23, 2013.

(51) Int. Cl.
*B62K 3/14* (2006.01)
*B62K 3/06* (2006.01)
(Continued)

(52) U.S. Cl.
CPC ............. *B62K 3/06* (2013.01); *B29C 43/003* (2013.01); *B29C 43/021* (2013.01); *B29C 43/52* (2013.01);
(Continued)

(58) Field of Classification Search
CPC ............. B62K 3/06; B62K 3/00; B62K 3/02
(Continued)

(56) References Cited

U.S. PATENT DOCUMENTS 4,613,146 A    9/1986  Sharp et al.
4,889,355 A   12/1989  Trimble
(Continued)

FOREIGN PATENT DOCUMENTS

CN    1143010    2/1997
DE    4230987    3/1994
(Continued)

OTHER PUBLICATIONS

Giant, "Win With Giant. The Truth About Road Frame Testing", Mar. 2013, Version 2. https://www.giant-bicycles.com/_upload/showcases/2013/TCR_FrameTestingData.pdf.

*Primary Examiner* — Tony H Winner
(74) *Attorney, Agent, or Firm* — Norton Rose Fulbright Canada LLP

(57) ABSTRACT

The described bicycle has a frame made of a composite material and defining a monocoque shell which is monolithic, entirely formed of the composite material, and includes: a rear upper portion, a head tube portion, and a rear mounting portion; and first and second side panels each extending between, and integrally formed with, at least the head tube portion at a forward end and the rear upper portion and the rear mounting portion at a rearward end. The first and second side panels are integrally interconnected along their respective top and bottom edges to form a substantially hollow shell structure at least partially enclosing a shell cavity defined between the laterally spaced apart first and second side panels. The hollow shell structure defines a rear opening between the rear upper portion and the rear mounting portion that communicates with the shell cavity.

14 Claims, 10 Drawing Sheets

(51) Int. Cl.
  *B62K 19/16* (2006.01)
  *B62K 25/28* (2006.01)
  *B29C 43/00* (2006.01)
  *B29C 43/02* (2006.01)
  *B29C 43/52* (2006.01)
  *B29L 31/30* (2006.01)
  *B29K 105/12* (2006.01)
  *B29K 307/04* (2006.01)

(52) U.S. Cl.
  CPC ............ *B62K 19/16* (2013.01); *B62K 25/286* (2013.01); *B29K 2105/12* (2013.01); *B29K 2307/04* (2013.01); *B29L 2031/3091* (2013.01)

(58) Field of Classification Search
  USPC .............................................. 280/274, 281.1
  See application file for complete search history.

(56) References Cited

U.S. PATENT DOCUMENTS

| | | | |
|---|---|---|---|
| 4,923,203 A | 5/1990 | Trimble | |
| RE33,295 E | 8/1990 | Trimble et al. | |
| 4,986,949 A * | 1/1991 | Trimble ............... | B29C 70/342 264/258 |
| 5,019,312 A | 5/1991 | Bishop | |
| 5,164,255 A | 11/1992 | Weeks | |
| 5,215,322 A | 6/1993 | Enders | |
| 5,273,303 A | 12/1993 | Hornzee-Jones | |
| 5,368,804 A | 11/1994 | Hwang et al. | |
| 5,533,742 A | 7/1996 | Peart | |
| 5,544,907 A | 8/1996 | Lin et al. | |
| 5,791,673 A | 8/1998 | Patterson | |
| 5,803,476 A | 9/1998 | Olson et al. | |
| 5,876,054 A | 3/1999 | Olson et al. | |
| 6,264,878 B1 | 7/2001 | Busby | |
| 6,340,509 B1 | 1/2002 | Nelson et al. | |
| 6,361,840 B2 | 3/2002 | Nelson et al. | |
| 6,848,700 B1 | 2/2005 | Fritschen | |
| 7,712,758 B2 | 5/2010 | Vroomen et al. | |
| 7,971,892 B2 | 7/2011 | Sasnowski et al. | |
| 8,460,123 B1 | 6/2013 | Demille et al. | |
| 2005/0035571 A1 | 2/2005 | Huck | |
| 2006/0290094 A1 | 12/2006 | Kamalian | |
| 2009/0212530 A1 | 8/2009 | Sasnowski et al. | |
| 2010/0109282 A1 | 5/2010 | Weagle | |
| 2012/0098232 A1 | 4/2012 | Calabresse Muzzi | |
| 2012/0242058 A1 | 9/2012 | Haimoff et al. | |

FOREIGN PATENT DOCUMENTS

| | | |
|---|---|---|
| EP | 0415436 | 10/1995 |
| EP | 0916477 | 5/1999 |
| FR | 2761947 | 10/1998 |
| WO | 95/24332 | 9/1995 |
| WO | 96/03306 | 2/1996 |
| WO | 2012107899 | 8/2012 |
| WO | 2012114226 | 8/2012 |

\* cited by examiner

Fig_1

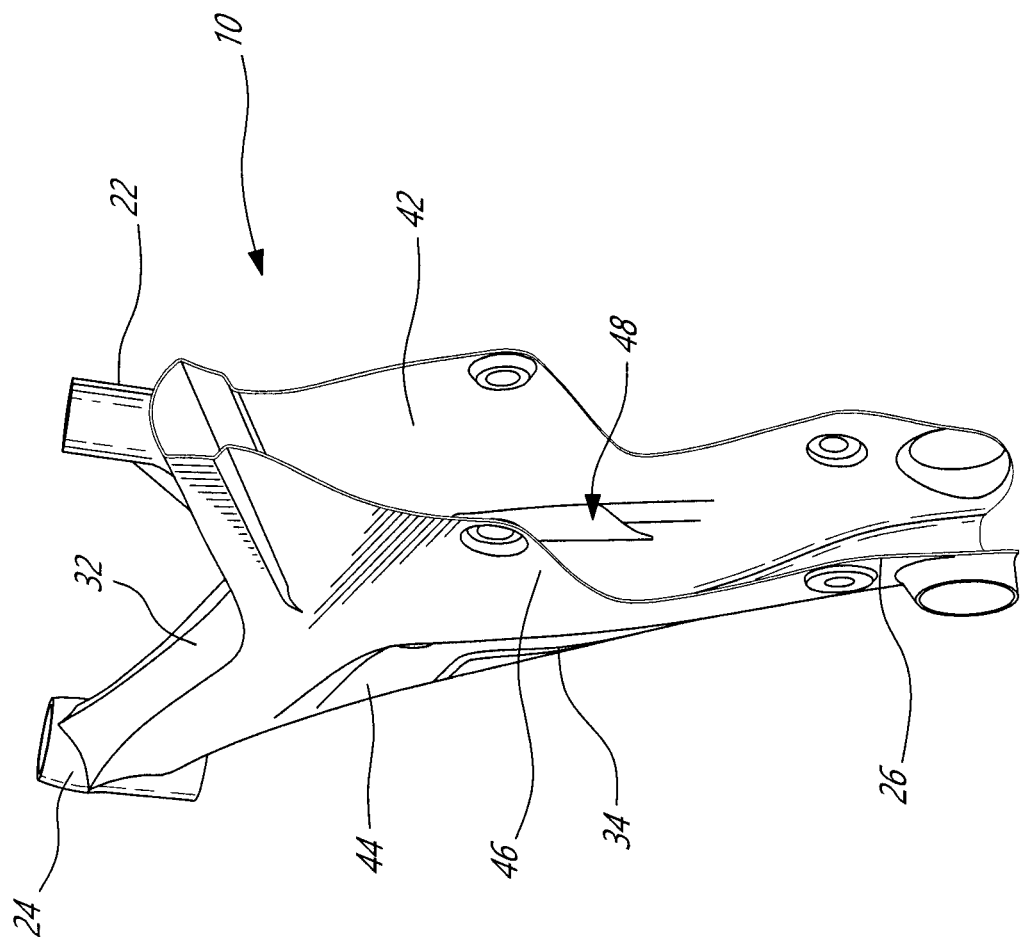

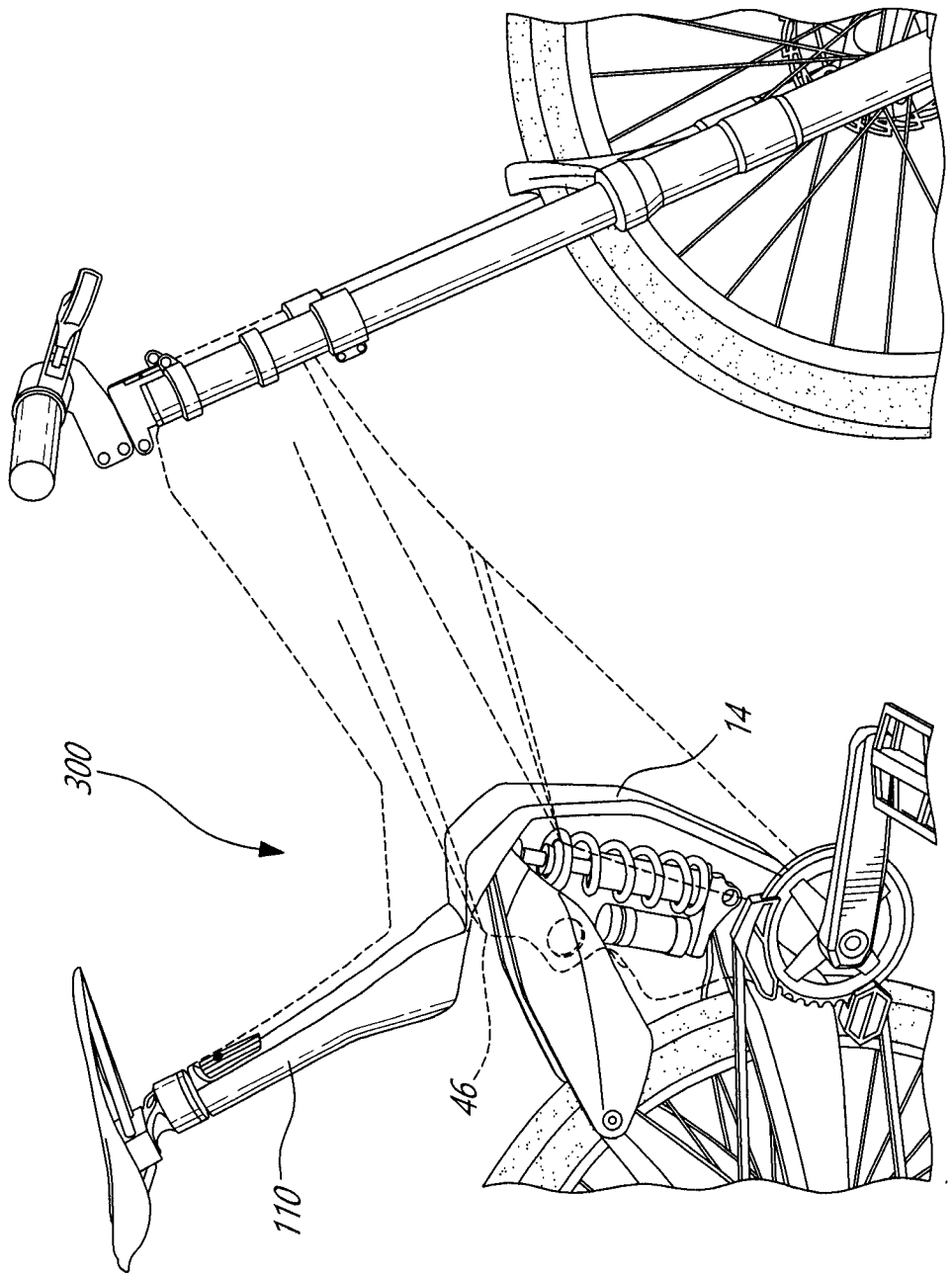

COMPOSITE BICYCLE FRAME AND METHOD OF MANUFACTURING SAME

TECHNICAL FIELD

The present invention relates generally to bicycles, and more specifically to composite bicycle frames.

BACKGROUND

Composite bicycle frames, such as those made of carbon fiber, are well known.

The advantage provided by composite bicycle frames is that they tend to be lighter than bicycle frames made from other materials, such as metals, while still providing the necessary structure required to support the loads generated while using the bicycle.

Certain composite bicycle frames are sometimes (incorrectly) referred to as being "monocoque". Such known carbon fiber tubular frames are typically composed of a number of separate tubular composite and/or metal components which are joined together to form the final composite "uni-body" frame. Most composite tubular frames are therefore not integrally formed, one-piece designs, much less "monocoque" in the sense of the term typically understood by most engineers, as will be defined in further detail below.

In fact, known composite tubular bicycle frames sometimes more closely resemble conventional, or "lug type", bicycle frames, which are made of individual components joined together with welds, mechanical fasteners and/or adhesives. Examples of certain known bicycle frames, as well as methods for manufacturing them, are provided in U.S. Pat. No. 5,368,804 and in U.S. Pat. No. 5,803,476.

While attempts have been made to mold composite bicycle frames, rather than forming them by more traditional carbon fiber lay-up and curing processes, the molds used can be difficult to manipulate, expensive to operate, and costly to manufacture. Yet another known disadvantage relates to the molding process itself, which is time consuming because of the manual labor involved, especially for highly complex tubular shapes and connections. Often, the composite material must be "laid-up" within the mold by hand, which can further increase labour costs, production cycles and therefore end-product cost. Furthermore, it is difficult to control some of the properties of known molded composite frames, such as their thickness, when using conventional molding processes. This consequently inhibits the rapid production of composite frames of uniform weight.

SUMMARY OF THE INVENTION

There is provided a bicycle frame made of a composite material, comprising: a monocoque shell bearing a majority of the loads to which the bicycle frame is subjected in use, the monocoque shell being monolithic and entirely formed of said composite material, the monocoque shell including: a rear upper portion, a head tube portion, and a rear mounting portion; and first and second side panels each extending between, and integrally formed with, at least the head tube portion at a forward end and the rear upper portion and the rear mounting portion at a rearward end, the first and second side panels being integrally interconnected along their respective top and bottom edges to form a substantially hollow shell structure at least partially enclosing a shell cavity defined between the first and second side panels which are laterally spaced apart, the hollow shell structure defining a rear opening between the rear upper portion and the rear mounting portion, the rear opening communicating with the shell cavity.

There is further provided a method of forming a bicycle frame from a composite material, comprising the steps of: compression molding a monocoque composite shell at least partially forming the bicycle frame, the monocoque composite shell being monolithic and entirely formed of said composite material, the step of molding further including: providing a molding assembly having at least first and second female molds and a male mold, the first female mold comprising a first frame cavity having a first cavity surface corresponding to an outer surface of a first side panel of the monocoque shell, the second female mold comprising a second frame cavity having a second cavity surface corresponding to an outer surface of a second side panel of the monocoque shell, the second cavity surface being substantially complementary to the first cavity surface; securing the first female mold and the second female mold together, thereby defining a molding space delimited by the first and second cavity surfaces; inserting the male mold having an outer molding surface into the molding space between the first and second cavity surfaces, the insertion of the male mold defining a fill volume about the male mold, the fill volume extending between the molding surface of the male mold and the first and second cavity surfaces of the first and second female molds; adding the composite material into the fill volume in an un-cured and flowable form; and curing the composite material within the molding assembly by applying thermal energy and pressure, thereby compression molding the monocoque composite shell which at least partially forms the bicycle frame.

There is also provided a bicycle comprising: a bicycle frame composed of a monocoque shell bearing a majority of the loads to which the bicycle is subjected in use, the monocoque shell being monolithic and entirely formed of a composite material, the monocoque shell forming at least the main front triangle portion of the bicycle frame and including: a composite rear upper portion, a composite head tube portion, and a composite rear mounting portion; and first and second composite side panels each extending between, and integrally formed with, at least the head tube portion at a forward end and the rear upper portion and the rear mounting portions at a rearward end, the first and second side panels being laterally spaced apart to define a cavity therebetween, the first and second side panels being integrally interconnected along their respective top and bottom edges to form a substantially hollow shell structure at least partially enclosing said cavity, the hollow shell structure defining a rear opening between the rear upper portion and the rear mounting portion, the rear opening providing access to the shell cavity; a fork mounted to the head tube portion of the monocoque shell, and a front wheel removably mounted to the fork; and a rear wheel support mounted to the rear mounting portion of the monocoque shell, and a rear wheel removably mounted to the rear wheel support.

BRIEF DESCRIPTION OF THE DRAWINGS

Reference will now be made to the accompanying drawings, showing by way of illustration optional embodiments of the present invention and in which:

FIG. 3 is a rear perspective view of the monocoque composite bicycle frame of the bicycle of FIG. 1;

FIG. 4B is a rear perspective view of a monocoque composite bicycle frame having a bulkhead, according to yet another embodiment of the present disclosure;

DETAILED DESCRIPTION

Figure 1:
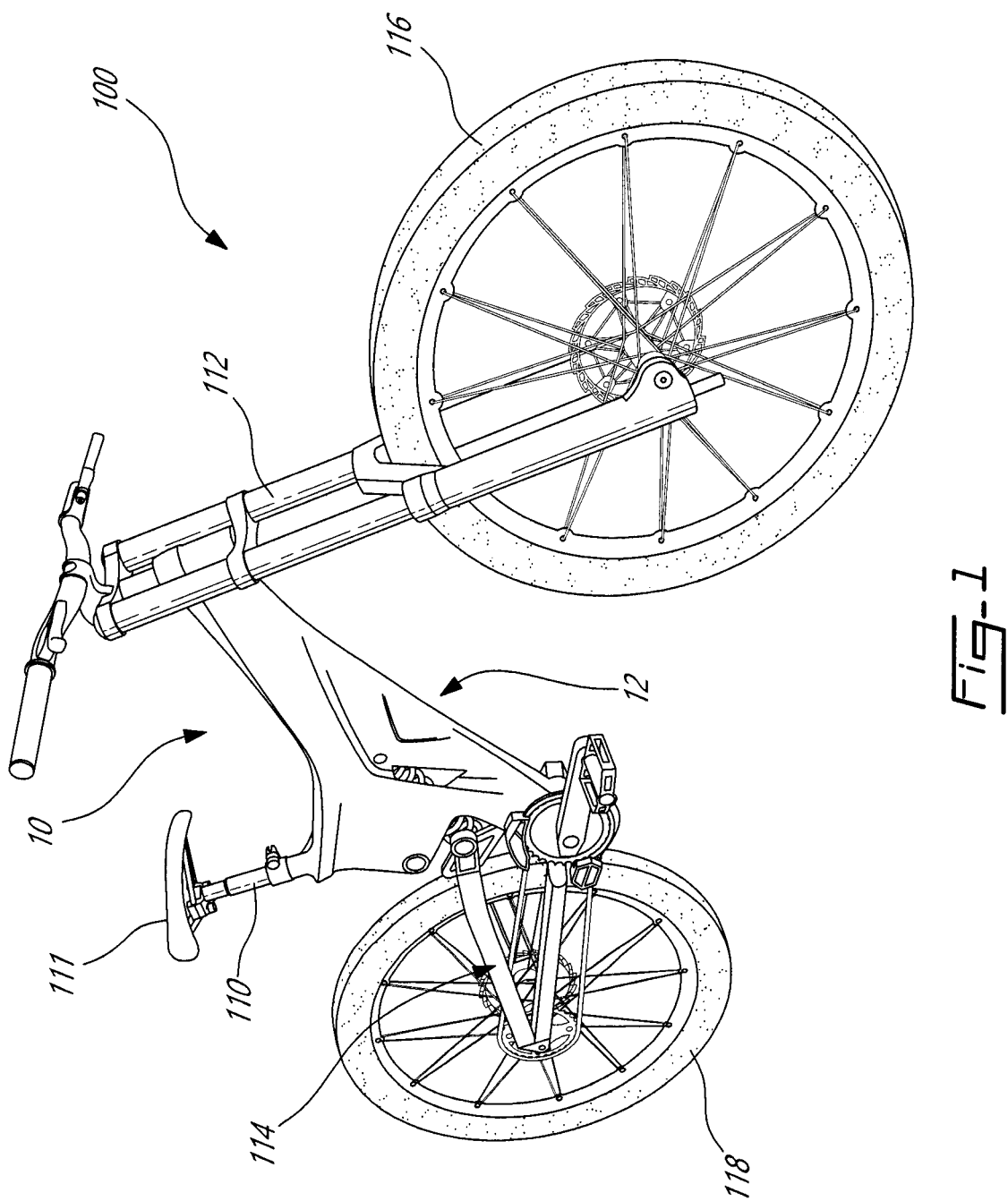
FIG. 1 is a perspective view of a bicycle having a monocoque composite bicycle frame according to an embodiment of the present disclosure.

A bicycle 100 in accordance with the present disclosure is depicted in FIG. 1. Although the bicycle 100 depicted in FIG. 1 is a rear-suspension mountain bicycle, the bicycle 100 disclosed herein is not limited to mountain bicycles. It will be appreciated that the bicycle 100 can be any other type of bicycle 100 such as, but not limited to, a hybrid bicycle, a road bicycle, a racing bicycle, a track bicycle, a motorcycle, etc. The bicycle 100 includes a monocoque composite bicycle frame 10, as described below in greater detail.

The monocoque composite frame 10 (or alternately "front triangle frame" or simply "frame") provides the principle structure to the bicycle 100, and allows it to support the loads generated when a user is sitting upon and riding the bicycle 100. Although the frame 10 disclosed herein is often shown as a "front triangle" portion of a bicycle frame, it is to be understood that the monocoque composite bicycle frame 10 may also form the entirety of the bicycle frame, for example in a bicycle that does not have any rear suspension (e.g. a hard-tailed mountain bicycle or a road bicycle). It is also understood that although the term "front triangle" is well known and used in the art to refer to that portion of the bicycle frame to which the seat, handle-bars and pedal crank are mounted, this forward section of the frame may be neither triangular in shape nor an interconnected tubed space-frame structure.

In fact, the monocoque composite bicycle frame 10 disclosed herein is precisely not an interconnected tubed space-frame structure, as is the case with most known prior art bicycles, even those formed of carbon fiber or other composite materials, but rather is formed of a true monocoque composite shell. The monocoque composite shell 12 of the frame 10 described herein is therefore by definition non-tubular, being instead formed of a load-bearing outer skin. Parallels may be drawn, for example, to the distinction between monocoque shell and tubular space frame designs, as employed in the automotive or aerospace industries for example.

The ability of the frame 10 to be truly monocoque is derived from the integrity of its structure. The term "monocoque" as used herein refers to the composition of the frame 10, in that it is a monolithic substantially hollow object of unified and intact construction, and whose outer surfaces or "skin" bear a significant portion of the loads acting thereon. The outer skin of the monocoque frame 10 is therefore said to be "stressed". In contrast to prior art frames, the loads acting upon the frame 10 disclosed herein are not borne by a tubular frame or truss-like structure, but are instead borne by the "skin" of the monocoque frame 10 itself. The term "monocoque" as used herein does not limit the frame 10 to having only one structural piece or member. Indeed, the frame 10 can be made from more than one piece or member provided that it defines a whole structure, the outer surfaces or skin of which bear the majority of the loads to which the frame is subjected. In a particular embodiment, the frame 10 is entirely formed in a single-event manufacturing process, such as molding, which is described below.

The monocoque composite bicycle frame 10 is therefore defined by a monocoque shell 12, or hollow structure. This monocoque shell 12 bears most of the loads generated by the user of the bicycle 100. It therefore provides the load-bearing structure to the bicycle frame 10, and also gives shape thereto.

Referring still to FIG. 1, components of the bicycle 100 can be mounted to, and removed from, the monocoque frame 10. One of these components is a seat post 110 with a seat 111, which can be mounted to, and removed from, a portion of the monocoque frame 10, such as a seat tube. The seat post 110 can be integrated into the monocoque frame 10, which can be achieved during the manufacturing process described below. Another such component is a fork 112 which can be mounted to, and removed from, the head tube of the monocoque frame 10. Yet another such component is a rear support 114 which can be mounted to, and removed from, the rear of the monocoque frame 10. The rear support 114 can be any suitable component which, at the very least, links the rear wheel of the bicycle 100 to the monocoque frame 10. Such a rear support 114 can include a rear frame, a rear suspension system, a bottom bracket, and many other similar components.

The bicycle 100 also includes a front wheel 116 which can be rotatably mounted to, and removed from, the fork 112, using any suitable technique. Similarly, a rear wheel 118 can be similarly mounted to the rear wheel suspension and/or fixed chain stays. Of course other components (e.g. pedals, pedal crank arms, a handle bar, etc.) associated with conventional bicycles 100 can be used in addition to the components described above, as required.

Figure 2:
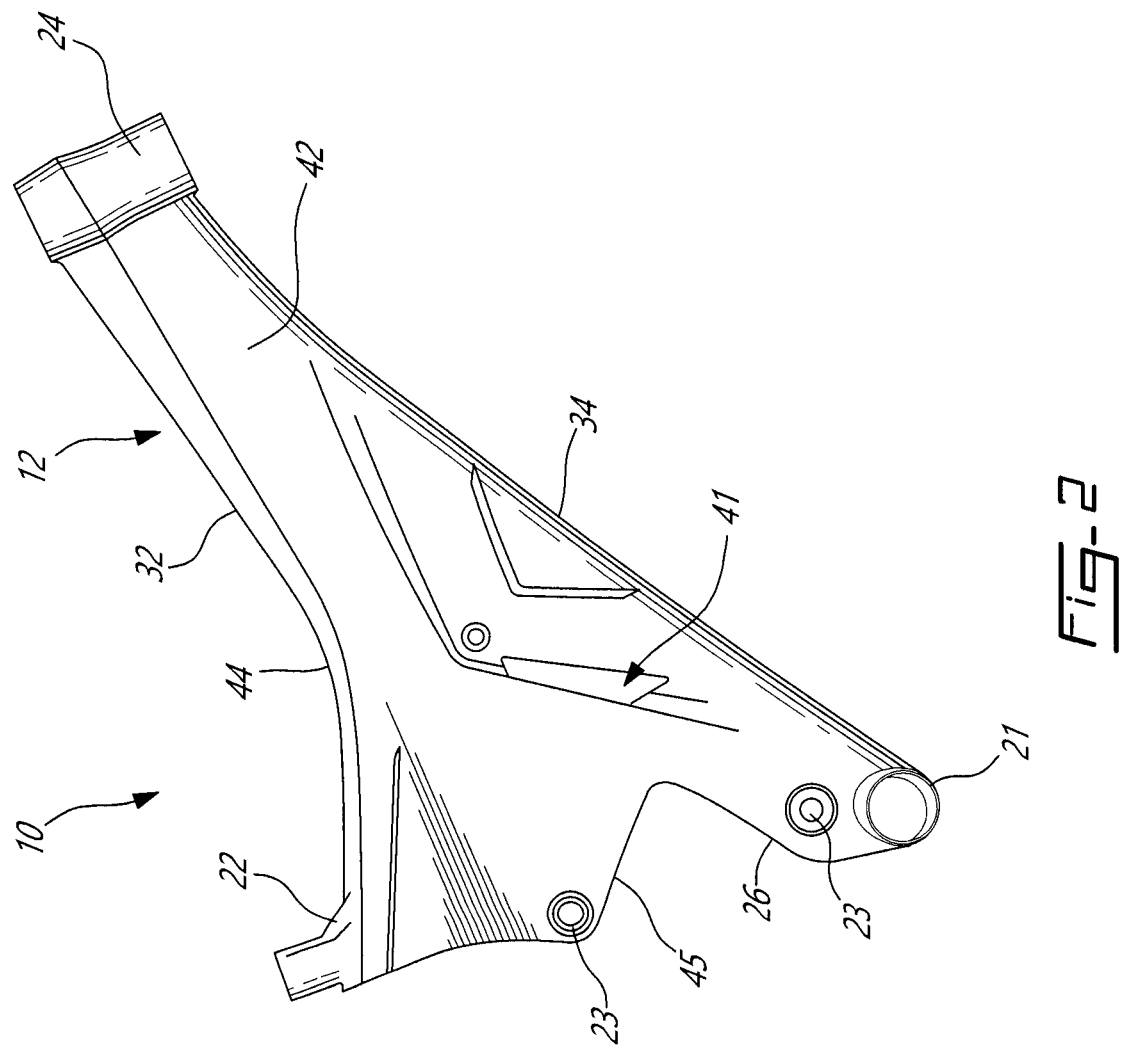
FIG. 2 is a side elevation view of the monocoque composite bicycle frame of the bicycle of FIG. 1.

Referring now to FIG. 2, the monocoque shell 12 of the frame 10 includes a rear upper portion 22, a head tube portion 24, and a rear mounting portion 26. The rear upper portion 22, head tube portion 24 and rear mounting portion 26 are parts of the shell 12 which can receive a corresponding component of the bicycle 100 when that component is mounted to the frame 10.

For example, the rear upper portion 22 is a part of the shell 12 which can receive a seat post or corresponding seat supporting structural element so that the seat of the bicycle can be attached to the frame 10. In an embodiment, the rear upper portion 22 of the shell 12 is made integral with the seat post, or the seat post is made integral with the rear upper portion 22. The rear upper portion 22 can be made integral with the seat post by being secondary bonded, which is the joining together by adhesive bonding of already-cured composite components by curing only the adhesive itself. Alternatively, where the seat post is made from a non-composite material such as a metal, it can be made attached using any mechanical fastener. As such, the rear upper portion 22 may occasionally be referred to herein as a "seat tube portion 22". However, it will be appreciated that the rear upper portion 22 is not required to have a seat tube or seat. For example, the rear upper portion 22 of some downhill mountain bikes may not have any seat at all, and may simply have a padded section.

Similarly, the rear mounting portion 26 is a part of the shell 12 which can receive a bottom bracket, pivot assemblies for links, shocks or other components of a rear suspension system, thereby linking the rear wheel to the frame 10. In certain embodiments, the portions 22,24,26 of the shell 12 can have mechanical fasteners or other bicycle components integrally formed directly therein.

The rear mounting portion 26 may include bores 21 and/or pivot points 23, which can be used to receive a bottom bracket, bearings/bushings of a rear suspension system, links, shock mounts, or other similar components of the bicycle.

The shell 12 also has a first side panel 42 and a second side panel 44 which collectively define the shape and extent of the shell 12. The side panels 42,44 can be any section of the shell 12 which forms a substantially continuous surface. The continuity of the surface of the side panels 42,44 may be interrupted by cut-out sections 41 which can advantageously reduce the weight of the frame 10 without adversely affecting its load-bearing properties, and which may improve the aesthetic appearance of the frame 10. The side panels 42,44 can also take on various surface profiles depending on numerous factors such as, but not limited to: the desired appearance of the surface of the side panels 42,44, any potential interference with the legs of the user, the location of bicycle components within the side panels 42,44, and the desired weight of the frame 10.

As shown in FIG. 3, the side panels 42,44 are disposed facing each other, and are integral and interconnected with one another along their upper and lower edges, shown as upper connecting member 32 and lower connecting member 34. The expression "integral and interconnected" means that the side panels 42,44 form a continuous and intact bond on both an upper edge of the shell 12, and a lower edge of the shell 12. Such a bond can be formed during the molding of the frame 10, for example.

The first side panel 42 and second side panel 44 form a substantially hollow shell structure 46, thereby defining the shell 12. The term "substantially" signifies that the hollow shell structure 46 can be fully hollow, mostly not hollow, or any degree of hollow in between. The hollow shell structure 46 is defined by the surfaces of the side panels 42,44. The hollow shell structure 46 encloses an empty volume, and extends between the seat tube portion 22, the head tube portion 24, and the rear mounting portion 26. In FIG. 3, this extension of the hollow shell structure 46 forms a substantially triangular frame 10, but other shapes and configurations are within the scope of the present disclosure. In light of the preceding, it can thus be appreciated that the side panels 42,44 form the "skin" of the shell 12, and thus provide the main structure for bearing and resisting the loads generated when the bicycle is ridden by a user.

The hollow shell structure 46 can be closed on all sides. Alternatively, the hollow shell structure 46 is closed on all sides except for the rear, which can define a rear opening 48 which allows for the ingress of parts and components of the bicycle into the hollow shell structure 46. The rear opening 48 extends along some or all of the distance of the hollow shell structure 46 between the seat tube portion 22 and the rear mounting portion 26. The rear opening 48 can take many different shapes and configurations. For example, the rear opening 48 can have one or more arced segments along its peripheral edge. The rear opening 48 of the shell 12 may allow for components of the bicycle, such as a rear suspension system, to be connected to the rear of the frame 10.

An upper connecting member 32 and a lower connecting member 34 may define the upper and lower edges of the shell 12. The terms "upper" and "lower" refer to the orientation of the shell 12 when in use as part of the bicycle. The upper and lower connecting members 32,34 can be any structural linkages which delimit the upper and lower boundaries of the shell 12. The upper connecting member 32 can be any structural link which extends along a length of an upper portion of the shell 12. In so doing, the upper connecting member 32 joins the seat tube portion 22 and the head tube portion 24. Similarly, the lower connecting member 34 joins the head tube portion 24 and the rear mounting portion 26.

Figure 4A:
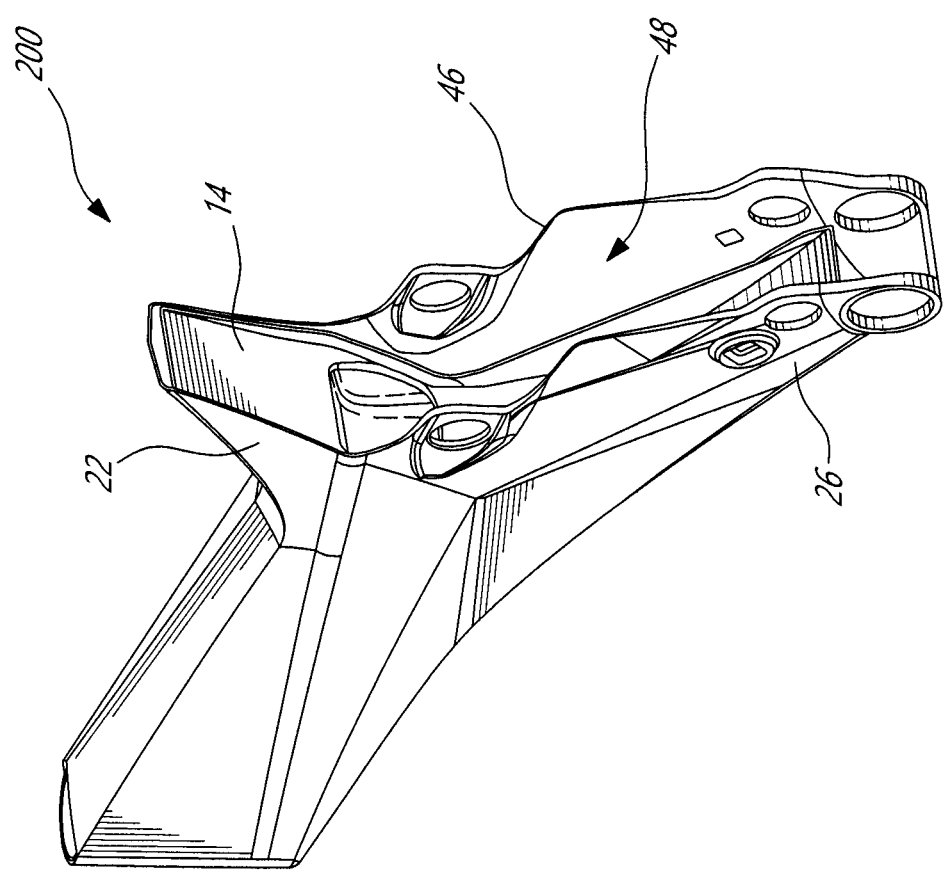
FIG. 4A is a rear perspective view of a monocoque composite bicycle frame having a bulkhead, according to another embodiment of the present disclosure.

Referring now to FIGS. 4A and 4B, alternate embodiments of the frame 200,300 are shown, each having one or more internal supports, stiffeners, ribs, or bulkheads 14 (collectively, "bulkheads"). The bulkhead 14 can be any support structure mounted or fixed within the hollow shell structure 46 which helps to reinforce the hollow shell structure 46 against some or all of the loads generated during the use of the bicycle. As such, the bulkhead 14 may take any suitable shape or configuration. For example, and as shown in FIG. 4A, the bulkhead 14 may be a substantially curved plate mounted within the rear of the hollow shell structure 46 via the rear opening 48. This substantially curved bulkhead 14 extends along some or all of the distance between the rear mounting portion 26 and the seat tube portion 22. In another embodiment, and as shown in FIG. 4B, the bulkhead 14 is made integral with the seat post 110, and the combined bulkhead-seatpost subassembly may then fixed in place within the frame 300 by using secondary bonding or bolting. The bulkhead 14 may be mounted or fixed as rearward as possible in order to increase the stiffness of the overall frame 200,300, while still being forward of other components, such as a suspension system. The bulkhead 14 may also have cut outs or ribs designed into its shape to achieve further stiffening benefits.

Some of the above-described features of the shell 12 are described separately from one another for explanatory purposes only. It will be appreciated that these features, and others, form an integral part of the shell 12 in most embodiments, such that the frame 10 is considered to be "single-shell" or "monocoque".

Figure 5:
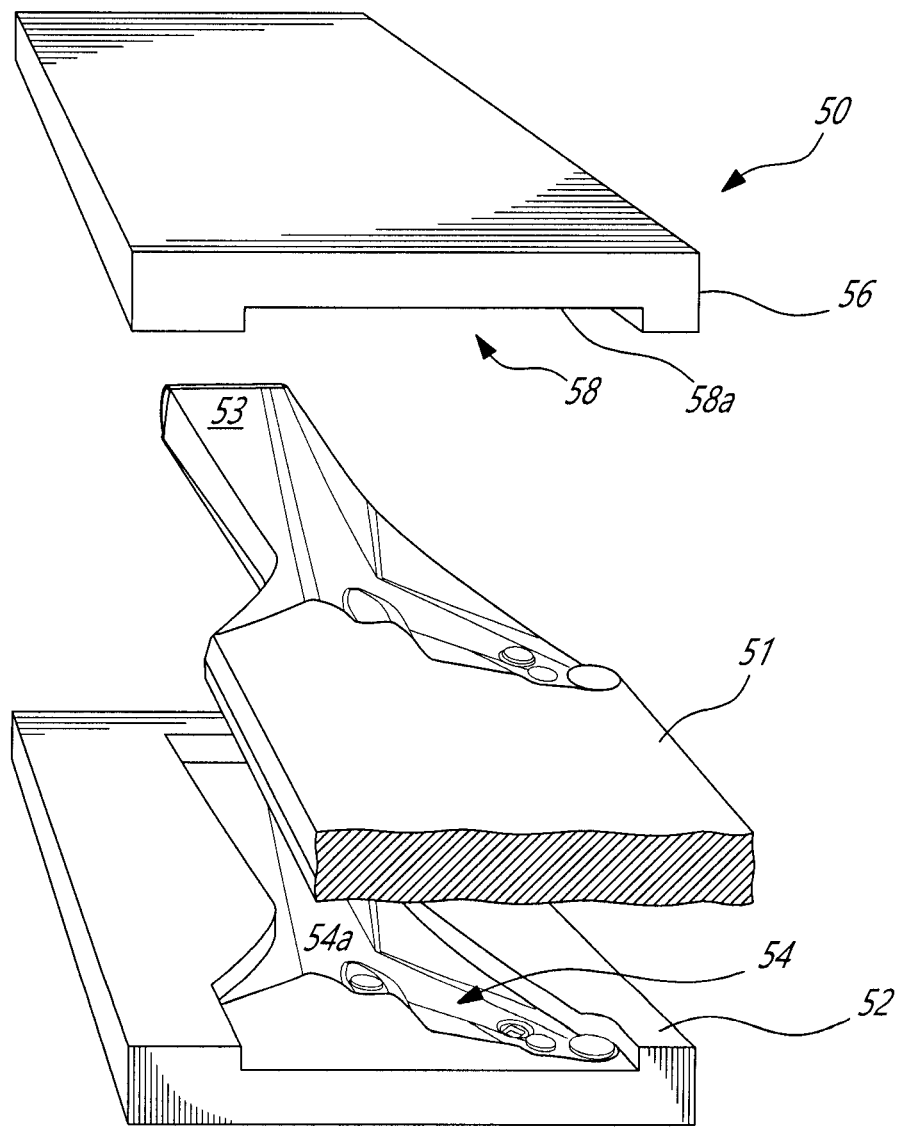
FIG. 5 is a schematic perspective view of a molding assembly, according to yet another embodiment of the present disclosure.
Figure 6:
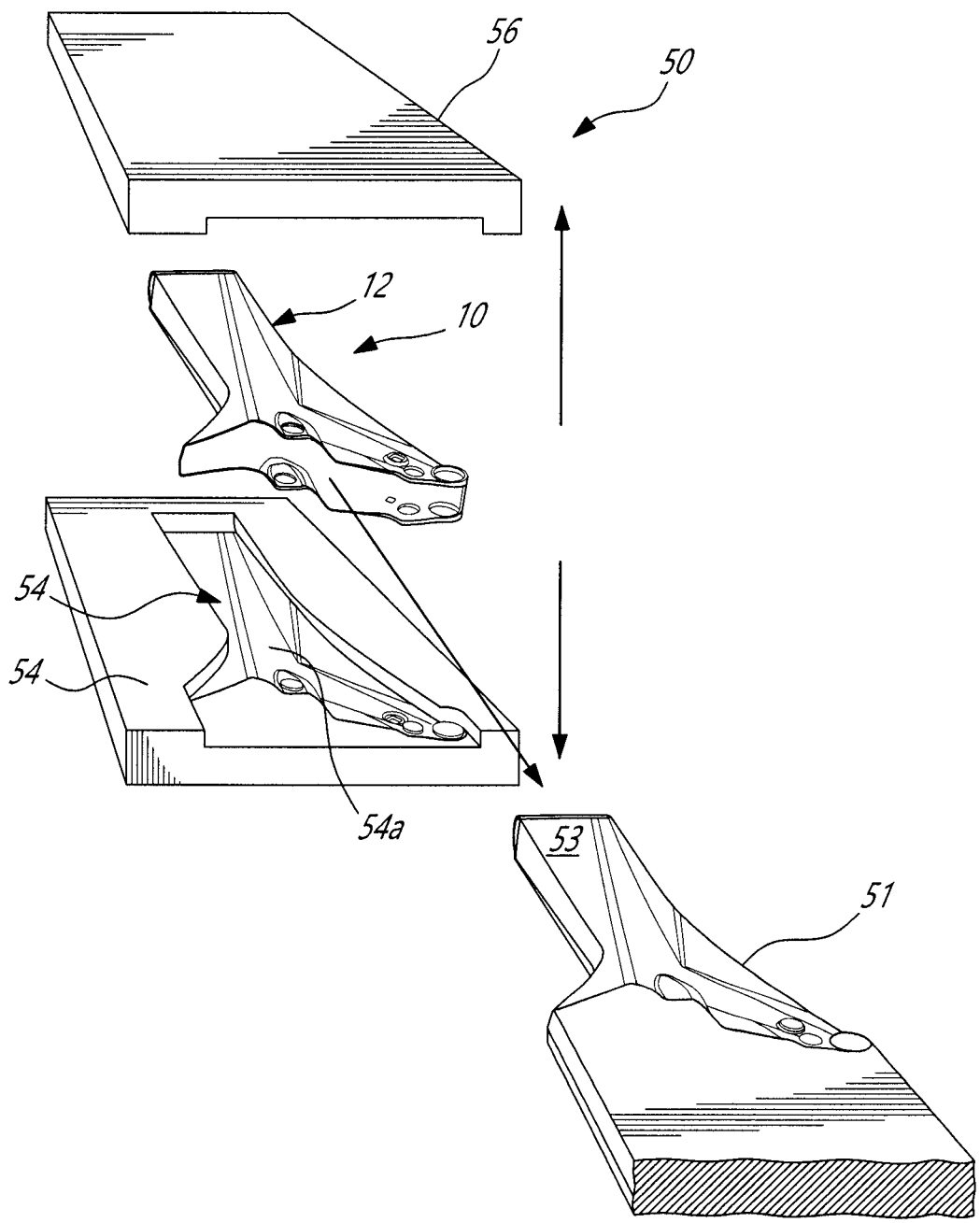
FIG. 6 is a schematic perspective view of another molding assembly, showing a first female mold, a second female mold, a male mold, and a molded monocoque composite bicycle frame, according to yet another embodiment of the present disclosure.
Figure 7A:
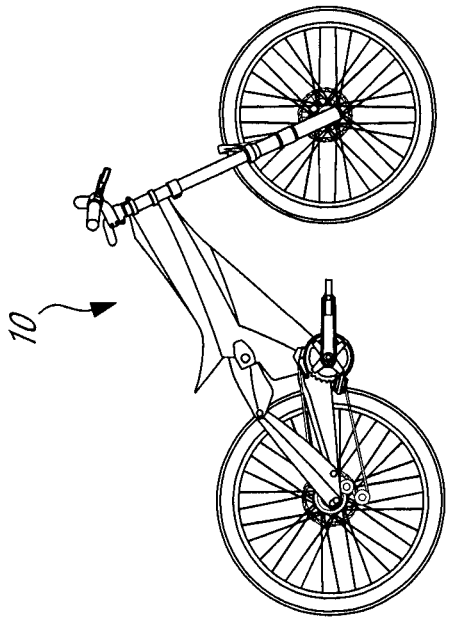
FIG. 7A is a perspective view of a bicycle having a monocoque composite bicycle frame, according to yet another embodiment of the present disclosure.
Figure 7B:
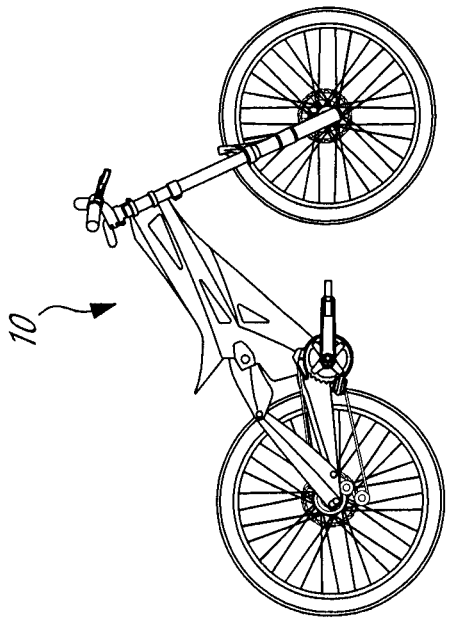
FIG. 7B is a perspective view of a bicycle having a monocoque composite bicycle frame, according to yet another embodiment of the present disclosure.
Figure 7C:
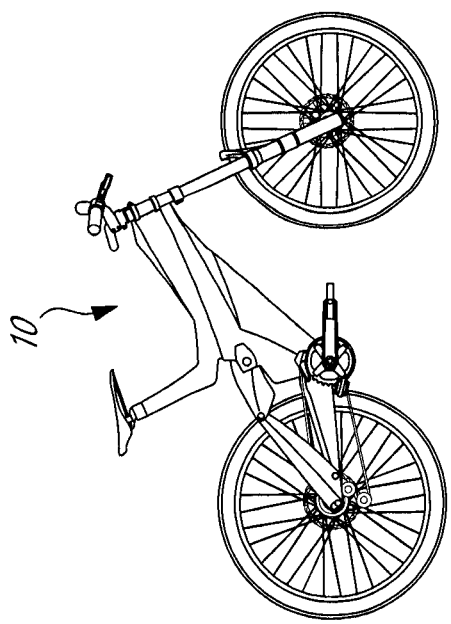
FIG. 7C is a perspective view of a bicycle having a monocoque composite bicycle frame, according to yet another embodiment of the present disclosure.
Figure 7D:
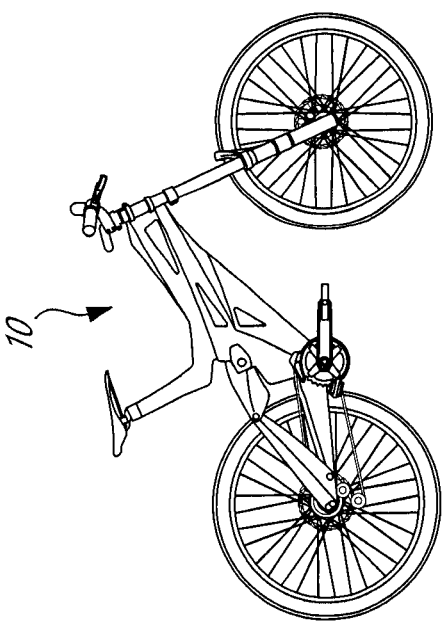
FIG. 7D is a perspective view of a bicycle having a monocoque composite bicycle frame, according to yet another embodiment of the present disclosure.

In accordance with another general aspect, and referring to FIGS. 5 and 6, a molding assembly 50 is also provided. The molding assembly is a matched mold assembly (i.e. including matching female and male components). The molding assembly 50, and the corresponding method of forming, are described below in relation to a monocoque composite bicycle frame 10. It will, however, be appreciated that the molding assembly 50, its components, and the corresponding method can be used to form other parts of the bicycle, such as a rear bicycle frame, or open-molded sections.

The molding assembly 50 has a first female mold 52. The first female mold 52 corresponds to the shape of the frame 10 to be molded. This correspondence can take many different forms. For example, this correspondence is achieved because the first female mold 52 forms a "negative" of the exterior surface of one side of the frame 10 to be molded. The first female mold 52 has a first frame cavity 54 having a first cavity surface 54a, which can be any indentation in the surface of the first female mold 52 which corresponds to the an outer surface of the first side panel of the of the frame 10 to be molded.

Since the first frame cavity 54 and first cavity surface 54a correspond to the shape of a part or half of the frame 10 to be molded, it can include portions that will help to form the seat tube portion, the head tube portion, and the rear mounting portion on one of the side panels of the shell 12 when the molding of the frame 10 is performed.

The molding assembly 50 also has a second female mold 56, which also corresponds to the shape of the frame 10 to be molded. As with the first female mold 52, the second female mold 56 has a second frame cavity 58 with a second cavity surface 58a. As with the first cavity surface 54a, the second cavity surface 58a corresponds to an outer surface of the second side panel of the shell 12, and may thus be complementary or identical to the first cavity surface 54a. The term "complementary" refers to the first cavity surface 54a and the second cavity surface 58a having the same shape, depth, length, and profile, so that each one can produce identical halves of the frame 10. The second frame cavity 58 can also have portions that will help to form the seat tube portion, the head tube portion, and the rear mounting portion on another side panel of the shell 12 when the molding of the frame 10 is performed.

Both the first and second female molds 52,56 can be secured or closed together. Pressure can be applied to the exterior of the female molds with a heated press that can achieve the pressures require for compression molding. In most embodiments, the female molds 52,56 are brought together so that their frame cavities 54,58 are facing one another. When so secured, the female molds 52,56 form an enclosed and empty molding space.

In most embodiments, but not necessarily all, the female molds 52,56 have identical frame cavities 54,58 so that they can form identical surface profiles for both sides of the frame 10 to be molded. Optionally, the profiles for internal supports, ribs, stiffeners, and bulkheads described above can be added to the female molds 52,56 so that these are made integral with the frame 10 when it is molded.

The molding assembly 50 also includes a male mold 51 which has an outer molding surface 53. The outer molding surface 53 forms the exterior of the male mold 51, and provides a surface pattern for the interior of the hollow frame 10 once it is molded. As such, the outer surface 53 can have multiple surface profiles which vary depending upon the desired surface pattern of the interior of the frame 10, or whether ribs or directional stiffeners are required, amongst other possible factors. Indeed, the outer surface 53 of the male mold 51 can be include ribs and directional stiffeners that align with the mold direction, thus allowing for an easier removal of the male mold 51 after curing.

Before, during, or after the female molds 52,56 have been secured together, the male mold 51 can be inserted therebetween. The insertion of the male mold 51 fills at least part of the enclosed empty molding space mentioned above, and defines a fill volume about the male mold 51. The fill volume is the volume of the enclosed empty space which surrounds the male mold 51, beginning at its outer molding surface 53 and extending to the first and second frame cavities 54,58 of the female molds 52,56. The fill volume receives the composite material. It can thus be appreciated that the fill volume forms a volume which substantially corresponds to the shape and thickness of the frame 10 to be molded. It can further be appreciated that such a fill volume can advantageously be easily adjusted so as to modify the thickness of the frame 10, modify the internal or external surface profile of the frame 10, and shorten or lengthen the frame 10, to name but a few possible adjustments. This ease with which adjustments can be made advantageously allows for molding frames having varying structure by adding removable inserts to the existing tooling, in contrast to some prior art composite frames. The mold assembly 50 is thus ready to receive the composite material which will form the frame 10.

The female molds 52,56 and the male mold 51 can be made of any suitable material. In most embodiments, this material is steel because of its reliability, durability and its ability to endure relatively high temperatures and pressures during the molding process.

The molding assembly 50 also has a curing assembly. The curing assembly can be any suitable device or machine which can apply the requisite thermal energy (e.g. heat) and pressure to the composite material inside the fill volume so as to form the frame 10.

In accordance with another general aspect, and still referring to FIGS. 5 and 6, a method of forming a monocoque composite bicycle frame 10 is also provided.

The method includes the step of providing a first female mold 52, and providing a second female mold 56, such as the ones describe above.

The method also includes the step of securing the female molds 52,56 together, so as to form the enclosed empty molding space.

The method also includes the step of inserting a male mold 51 and its outer surface 53 between the secured first and second female molds 52,56. This insertion of the male mold 51 defines the fill volume.

The method also includes the step of adding the composite material into the fill volume. The addition of the composite material can be varied depending upon many factors, such as the rate of production and the composite material being used, and the nature of the frame 10 being molded. In one possible embodiment, sheets of the composite material can be laid-up against the male mold 51 and/or the female molds 52,56. In another possible embodiment, chopped carbon fibers resin system material can be placed into the fill volume. Of course, a combination of prepreg sheets and chopped fiber molding compound can also be added to the fill volume. With such a combination, the chopped fibers can be conveyed or flow, fluid-like, into the fill volume and remote or inaccessible areas of the molding surfaces 53,54,58 when cured, thereby facilitating the production of a more consistent frame 10. The thickness of the frame 10 to be molded can be varied through the matched mold design (female+male mold) and through the composite material moving to fill mold space. Furthermore, certain fittings, brackets, and other mechanical fasteners can integrated into the female molds 52,56 or the male mold 51 so that they form an integral part of the frame 10 once it is cured.

The method also includes the step of curing the composite material by applying thermal energy and pressure, so as to form the frame 10. The molding temperature can range from about 110° C. to about 190° C. if done using compression molding or autoclave. With compression molding, the male and female molds 51,52,56 can be heated and remain hot during the entire process. Cure times may be dependent on the frame 10 thickness, amongst other factors, and therefore can range from about 90 seconds to about 10 minutes. The pressure applied within the mold can vary from about 500 psi to about 1,500 psi for molds 51,52,56 made of certain metals (e.g. aluminum, Invar or steel). The pressure can be applied by an external press. For example, a 10"×15" composite panel might require a 60-150 ton press. Since the molds 51,52,56 remain hot, and since the cured frame 10 can be extracted or ejected immediately after the cure time, a new frame can be immediately started. As a result of this shorter curing time and simplified material placement process, the method can provide improved through-put when compared to conventional composite bicycle frame construction. Cooling can be performed either at room temperature or in a progressive cooled oven, both freestanding or in a support jig.

The male mold 51 is extracted from the empty molding space once the frame 10 has been formed. The male mold 51 and the outer surface 53 can be so designed so as to facilitate the removal of the male mold 51 from the empty molding spaced. For example, the male mold 51 can have a straight or widening shape, or can be designed to be extracted along a path that accommodates the shape of the frame 10.

At any time during the steps of the method, the cured frame 10 can be polished, drilled, or otherwise machined, as desired.

It will be appreciated that the steps of the above-described method can be varied or interchanged without departing from the scope of the present disclosure. It will be further appreciated that the above-described method advantageously allows for the formation of a monocoque, single-shell, etc. bicycle frame 10. Such a frame 10 may advantageously better cope with the stresses acting thereon by transferring these stresses from the "joints" to the "skin" of the side panels 42,22 because of its monocoque construction.

The term "composite" refers to the material from which the frame 10 and its components are made. In an embodiment, the frame and its components are formed of a flowable composite material. The term "flowable" refers to the fluid-like properties assumed by the composite material when subjected to suitable pressures and temperatures. This flowable composite material can flow from its original placed position within the mold into the folds and nooks of the contour of the cavity and mold surfaces used to make the frame 10. One example of such a flowable composite material includes chopped carbon fiber mats integrated with pre-staged resin which is then compression molded. One example of such a compression molded composite is commercialized under the name of FORGED COMPOSITE™. It will however be appreciated that other appropriate composite materials can be used to form the frame 10, as required.

The use of a chopped carbon fiber composite resin system can provide certain advantages over other known materials, such as unidirectional fiber or fabric sheets. One possible advantage arises from the random orientation of the chopped carbon fibers of the frame 10. This random orientation prevents or significantly reduces the propagation of impact damage or stress fractures along directional lines, a problem which is observed in frames made from directional fiber sheets. The reduction in fracture propagation advantageously increases the reliability and durability of the frame 10 because it can better resist the usual damage that results from use. The reduction in fracture propagation further allows for the insertion of cut-outs without significantly affecting the structural integrity of the frame 10.

Another possible advantage results from the fact that the material can flow during the curing process, in that the use of such a composite material can facilitate the manufacturing of a more detailed contour for the side panels of the frame 10. Details can include and are not limited to varying thicknesses, hard corners, ribs, stiffeners and aesthetic details. This can be achieved because the chopped carbon fibers can flow from their original placed position in the mold into the folds and nooks of the contour of the cavity and mold surfaces used to make the frame 10, especially when compared to known fiber sheets which must be laid-up by hand against said contour and thus are more difficult to insert in the folds and nooks.

Such versatility may also improve the overall strength of the detailed sections of the frame parts because these detailed corners and cross sections can include structural fibers. In contrast, a fabric material might not move from its original position in the curing process into these tight locations, making these locations resin rich (i.e. not fiber reinforced) and thus lacking strength. Therefore, in using chopped fiber resin systems for the structural elements of the bicycle frame 10, the final frame may be able to achieve more complex shapes that may not have been possible with a conventional hand layup processes. Furthermore, conventional fabric frames may be limited to producing a frame with a constant thickness because the material is limited to the fabric thickness and the number of layers. Increasing or decreasing this thickness might require adding new layers of fabric to the mold. In contrast, the chopped fiber resin reinforced material can flow within the mold, and thus, achieve varying thickness without the manual adjustments in the mold or layup.

The composite monocoque frame 10 disclosed herein can have a lower mass than conventional frames made from metal alloys. Furthermore, the composite monocoque frame 10 can have a greater stiffness-to-weight ratio when compared to conventional frames made from metal alloys. It can thus be appreciated that many embodiments of the monocoque frame 10 disclosed herein have a greater stiffness-to-weight ratio than conventional metal alloy frames, without suffering a weight penalty that is typically associated with an increased stiffness-to-weight ratio.

Although the monocoque composite bicycle frame 10 depicted in the figures forms a front triangle portion, the frame 10 disclosed herein, as well as the corresponding method for manufacturing the frame 10, the bicycle 100, and the molding assembly, are not limited only to front triangle portions of bicycle frames. The devices, tools, and methods disclosed herein can be used, and are useful for, other portions of bicycle frames, such as components of a rear suspension system of a mountain bicycle, or to entire bicycle frames in the case of hard-tail mountain bicycle frames or road bicycle frames. Furthermore, the frame 10 can take shapes and configurations. Indeed, FIGS. 7A to 7D provide examples of frames 10 having different shapes and configurations.

Figure 8:
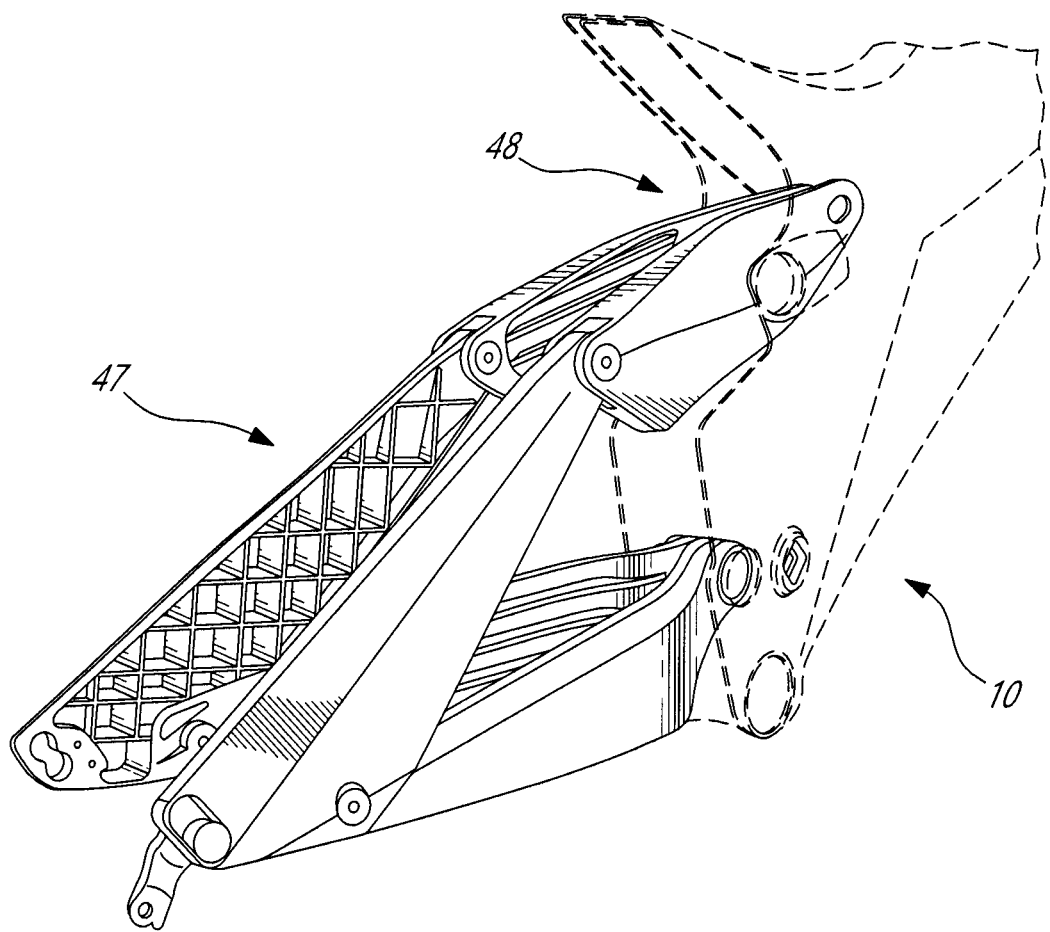
FIG. 8 is a perspective view of a rear suspension assembly formed of composite link members which are mounted to a monocoque composite bicycle frame, according to yet another embodiment of the present disclosure.
Figure 9:
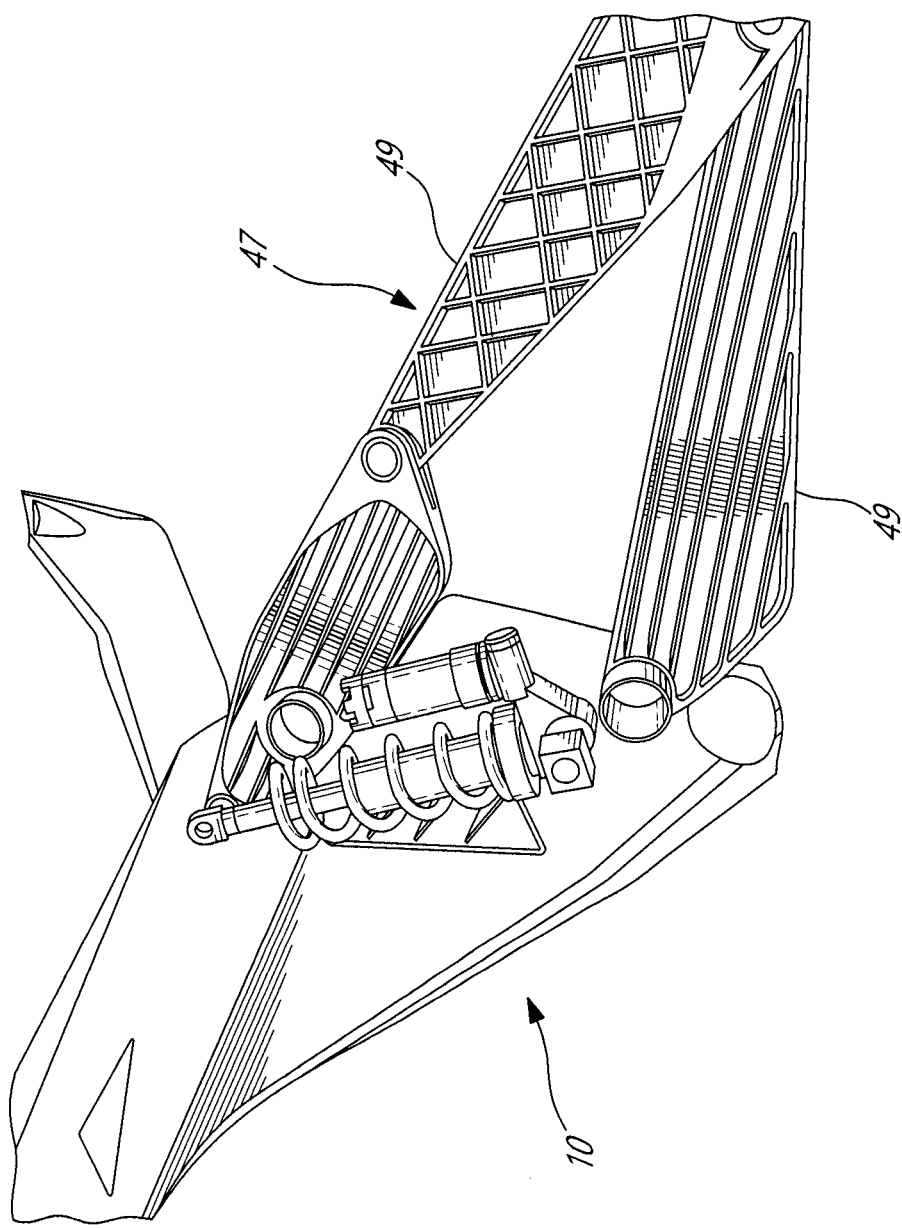
FIG. 9 is a partial cross-sectional view of the rear suspension assembly of FIG. 7, showing open-sectioned composite link members.

One example of a different composite frame component is shown in FIGS. 8 and 9. FIG. 8 shows an all-composite rear suspension assembly 47 having an open-section construction mounted to the rear end of the frame 10 near the rear opening 48. An "open-section construction" is an object which does not have a block mass of material in its interior. Instead, such an object is able to support loads through an inner framework of support structures. Such open-section constructions help to reduce the overall weight of the object. As seen in FIG. 9, the rear suspension assembly 47 includes a number of link members 49 which are also formed of the same compression molded composite material as the front triangle of the frame 10. As can be readily seen in the partial cross-sectional view of FIG. 9, the link members 49 of the rear suspension assembly 47 have an open-section construction. These open sections for the rear suspension assembly 47 (e.g. rear linkage assembly, rear triangle, and rear suspension) can include, in one exemplary embodiment, a chainstay, seat stay component, and a pivoting rocker link component. In conventional tubular frames, these linkage components are usually comprised of a middle tubular structure and pivot joints on the farthest ends of each tubular link. The chopped fiber resin system material and match mold compression molding as described herein for creating the front triangle monocoque can also be used to make these open-sectioned composite rear links of the composite rear suspension assembly 47. These open sectioned link members can achieve necessary stiffness and weight requirements with ribs, stiffeners, grid shapes that can be integrally molded directly therein, in contrast to existing hand layup molding processes.

The embodiments of the invention described above are intended to be exemplary. Those skilled in the art will therefore appreciate that the foregoing description is illustrative only, and that various alternate configurations and modifications can be devised without departing from the spirit of the present disclosure. Accordingly, the present invention is intended to embrace all such alternate configurations, modifications and variances which fall within the scope of the appended claims.

The invention claimed is:

1. A bicycle frame, comprising:
a monocoque shell bearing a majority of the loads to which the bicycle frame is subjected in use, the monocoque shell being monolithic and entirely formed of a composite material including chopped carbon fiber having a substantially random orientation within a pre-staged resin, the monocoque shell being a compression molded composite;
the monocoque shell including:
a rear upper portion, a head tube portion, and a rear mounting portion; and
first and second side panels each extending between, and integrally formed with, at least the head tube portion at a forward end and the rear upper portion and the rear mounting portion at a rearward end, the first and second side panels being integrally interconnected along their respective top and bottom edges to form a substantially hollow shell structure at least partially enclosing a shell cavity defined between the first and second side panels which are laterally spaced apart, the hollow shell structure defining a rear opening between the rear upper portion and the rear mounting portion, the rear opening communicating with the shell cavity.

2. The frame of claim of claim 1, further comprising at least one bulkhead mounted within the shell cavity of the substantially hollow shell structure, the bulkhead extending laterally between the first and second side panels to provide additional structural properties to the monocoque shell.

3. The frame of claim 2, wherein the bulkhead is disposed adjacent to the rear opening of the monocoque shell.

4. The frame of claim 2, wherein the bulkhead comprises a curved plate formed of said composite material.

5. The frame of claim 4, wherein the bulkhead is integrally formed with the hollow shell structure.

6. The frame of claim 1, further comprising at least one cut-out in at least one of the first and second side panels.

7. A bicycle comprising:
a bicycle frame composed of a monocoque shell bearing a majority of the loads to which the bicycle is subjected in use, the monocoque shell being monolithic and entirely formed of a composite material including chopped carbon fiber having a substantially random orientation within a pre-staged resin, the monocoque shell being a compression molded composite, the monocoque shell forming at least the main front triangle portion of the bicycle frame and including:
a composite rear upper portion, a composite head tube portion, and a composite rear mounting portion; and
first and second composite side panels each extending between, and integrally formed with, at least the head tube portion at a forward end and the rear upper portion and the rear mounting portions at a rearward end, the first and second side panels being laterally spaced apart to define a cavity therebetween, the first and second side panels being integrally interconnected along their respective top and bottom edges to form a substantially hollow shell structure at least partially enclosing said cavity, the hollow shell structure defining a rear opening between the rear upper portion and the rear mounting portion, the rear opening providing access to the shell cavity;
a fork mounted to the head tube portion of the monocoque shell, and a front wheel removably mounted to the fork; and
a rear wheel support mounted to the rear mounting portion of the monocoque shell, and a rear wheel removably mounted to the rear wheel support.

8. The bicycle of claim 7, further comprising a bulkhead mounted within the cavity of the substantially hollow shell structure, the bulkhead extending laterally between the first and second side panels to provide additional structural properties to the monocoque shell.

9. The bicycle of claim 8, wherein the bulkhead is disposed adjacent to the rear opening of the monocoque shell.

10. The bicycle of claim 8, wherein the bulkhead comprises a curved plate formed of said composite material.

11. The bicycle of claim 10, wherein bulkhead is integrally formed with the hollow shell structure of the monocoque shell.

12. The bicycle of claim 7, further comprising at least one cut-out in at least one of the first and second side panels.

13. The bicycle of claim 7, further comprising a composite seat post integrally formed with the rear upper portion of the monocoque shell.

14. The bicycle of claim 7, wherein the bicycle is a mountain bicycle having a rear-suspension, the rear-suspension comprising a composite rear suspension assembly pivotably mounted to the rear mounting portion of the monocoque shell, the rear suspension assembly formed of one or more composite link members formed of the composite material and having an open-section construction.

* * * * *